PRIOR CONSTRUCTION

July 7, 1970  G. F. HYDE  3,519,245

VALVE STRUCTURE

Filed Aug. 23, 1968  2 Sheets-Sheet 2

WITNESSES
Helen M. Farkas

E. Strickland

INVENTOR
Gilbert F. Hyde

BY
ATTORNEY

United States Patent Office 3,519,245
Patented July 7, 1970

3,519,245
VALVE STRUCTURE
Gilbert F. Hyde, Chester, Pa., assignor to Westinghouse Electric Corporation, Pittsburgh, Pa., a corporation of Pennsylvania
Filed Aug. 23, 1968, Ser. No. 754,767
Int. Cl. F16k *25/00, 29/00, 51/00*
U.S. Cl. 251—86                               5 Claims

ABSTRACT OF THE DISCLOSURE

The invention comprises a valve structure having a valve member with a spherical seating surface and spherical valve stem lifting surface, the radii of said spherical surfaces being coincident with the center of gravity of said valve member, said center of gravity being below the location of the valve stem lifting surface. With such a structure the valve member is stable and the center of the seat radius of the valve member will not move from the valve seat centerline when the member is tilted by an external force, for example.

BACKGROUND OF THE INVENTION

The present invention relates to valve structures for controlling the flow of high pressure elastic fluid such as steam, and particularly to a valve structure in which a valve seating member or plug will stay on the centerline of an annular valve seat provided in a valve housing.

In order for a valve plug to seat properly in a corresponding annular valve seat in the valve body, the center of the spherical seat radius of the plug must be on the centerline of the valve seat. With present and prior designs and constructions, the valve plug is attached to a valve stem below the center of gravity of the plug so that the plug will tilt within the clearance of the plug directing guide or sleeve. The center of the plug seat spherical radius then moves away from the annular valve seat centerline so that the plug seats in a cocked or tilted manner leaving a crescent shaped opening (in a manner to be more fully explained hereinafter) through which high velocity and pressure steam, or other fluid to be controlled, can freely pass. With the valve partially open and partially seated in abutment with the annular valve seat, the high pressure fluid flow therepast can induce severe vibrations in the valve stems which causes peaning of the various metallic components of the valve structure. In some instances, the peaning causes the valve stems to break. When the valve member is lifted clear of the valve seat throughout its entire periphery the fluid flows more freely and its effect on the movable valve components is then negligible.

Further, prior and present valve designs have balance chambers which are not rapidly responsive to changes in the downstream pressures. This is usually caused by the large volume of the balance chambers and the restricted openings provided in the valve plug through which the downstream pressure is communicated to the chamber. As is well known, pressure across the plug must be substantially balanced or equalized to facilitate opening of the valve.

A further problem exists with the pressure communicating openings in the balance chamber, namely, their location with reference to the valve seat and to the flow of high velocity fluid to be controlled by the valve. Presently, such openings are located at or closely adjacent to the valve seat so that with a high velocity flow of fluid past the seat, the flow is across the entrances of the openings which tends to close the openings and thereby prevent the communication of downstream pressure therethrough.

Present valve plug members are further provided with a flexible seat to absorb energy when the member impacts against valve seat upon fast closing. This is a costly feature in terms of both material and manufacturing costs as will be explained more particularly hereinafter.

BRIEF SUMMARY

Briefly, the present invention provides a stable valve structure in which a valve stem spherical lifting surface engages a valve plug above its center of gravity, and the radial center of said lifting surface is coincident with the radial center of the spherical seating surface of the valve plug at the center of gravity. In this manner the plug will not tilt when it is lifted from and returned to the valve seat unless acted upon by an external force, in which case, the center of the plug will not move from the centerline of the valve seat.

Thus, the valve member of the present disclosure has an equilibrium restoring ability which seats the member in even abutment with the annular valve seat around its entire periphery. For this reason, no opening is allowed to exist in the valve through which high velocity fluid can flow and thus vibrate the movable valve components.

With the spherical lifting surface above the plug center of gravity, the balance chamber is made smaller and the pressure communicating openings in the plug are disposed away from the valve seat and the flow of high velocity fluid. Thus, the smaller balance chamber provides faster response to changes in pressure across the plug, and the pressure communicating openings remain free of the closing effect of the rapid flow of fluid past the valve seat.

A further advantage with the invention is the elimination of the costly flexible plug. The invention permits a minor radial deflection in the area of the plug seat when the plug impacts against the annular value seat in the valve body with fast valve closing.

Both the prior and presently disclosed valve plugs may be made from high alloy steel forgings, the valve plug of the present disclosure being easier and therefore a less costly forging to make.

THE DRAWINGS

The invention, along with its objects and advantages, will be more apparent from reading the following detailed description in connection with the accompanying drawing in which.

PREFERRED EMBODIMENT

Figure 1:
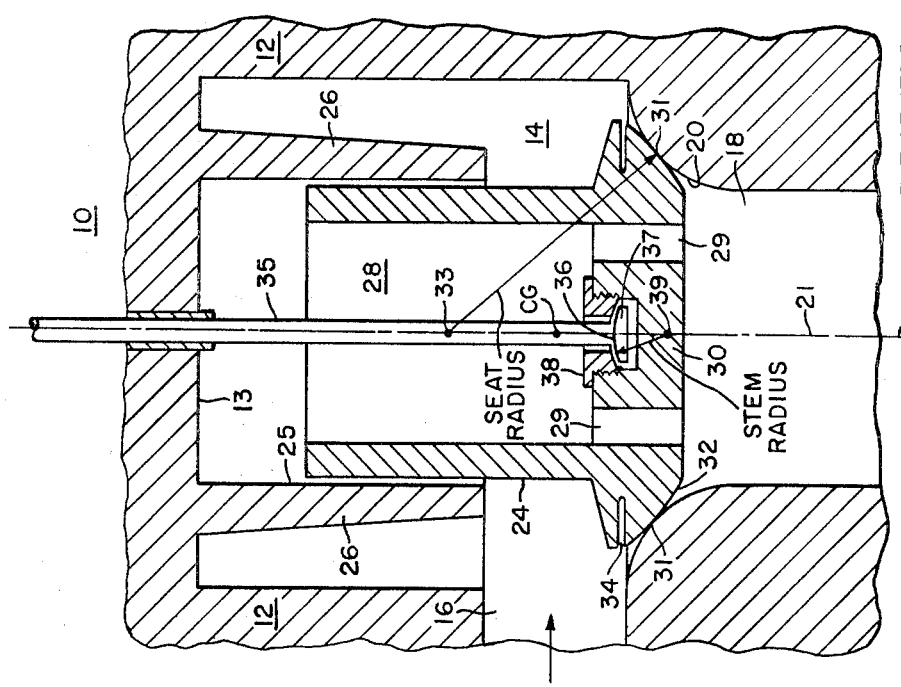
FIG. 1 is a sectional view of a prior art and presently used valve construction.

Referring to the drawings in detail, FIG. 1 shows a valve structure, generally designated 10, of the type presently being used and having the attendant disadvantages and problems described above. Specifically, the structure includes a housing, generally designated 12, with an end wall 13, the housing forming a main valve chamber 14. The housing is further provided with inlet and outlet ports 16 and 18 respectively, communicating with the main valve chamber.

The outlet port 18 is provided with a smoothly rounded valve seat 20 of annular shape and having a seat centerline 21 extending vertically through the outlet port 18 and chamber 14.

A movable valve member or plug 24 is disposed in the chamber 14 on center alignment with the seat centerline 21. The valve member is a cup-shaped structure slidably disposed in a bore 25 formed by a depending sleeve or valve guide structure 26 which sleeve or guide may be an integral part of the upper wall 13.

The valve member 24 with the depending sleeve 26 and the end wall 13 form a pressure balancing chamber 28 within the main chamber 14, the balancing being effected by the communication of the pressure downstream of the outlet port 18 through ports or openings 29 provided in an enlarged end portion 30 of the valve member adjacent the annular valve seat 20.

The enlarged end portion 30 of the valve member 24 has a convex spherical shaped valve seating surface 32 having a seat radius center 33 on the seat centerline 21 above a point indicated as CG on the centerline, the point CG designating the center of gravity of the valve member 24. The seating surface 32 is designed to seat in and engage the annular valve seat 20 along circumferential line, indicated at 31, to block the flow of pressurized fluid directed through the inlet port 16 as indicated by the arrow.

The end portion 30 of the valve member 24 is further provided with a deep circumferential slot 34 at a location above the spherical seating surface 32. The slot 34 reduces somewhat the peripheral mass of the end portion 30 to give said mass a resilient characteristic and thus a means to cushion the valve member when it engages the annular valve seat 20 upon rapid closing of the valve 10.

The valve member 24 is attached to an actuating valve stem or shaft 35 slidably received through the end wall 13 of the housing 12, the end wall being sealed about the stem to minimize fluid leakage to atmosphere.

The valve member 24 is attached to the stem 35 below the center of gravity CG of the valve member by a convex spherical lifting surface 36 formed on an enlarged end portion or flange 37 disposed at the lower end of the stem. The flange 37 is secured in the end portion 30 of the valve member by a threaded insert 38 having a concave spherical surface corresponding to that of the lifting surface 36 for engaging the same, the insert being threaded into the end portion 30 of the valve member 24.

Like the spherical seating surface 32, the spherical lifting surface 36 has a radius center 39 on the valve seat centerline 21 as shown. However, it will be noticed that the centers of the seating and lifting surface radii are spaced apart along the seat centerline with the center of gravity (point CG) located therebetween.

With the valve structure 10, as thus far described, the valve member 24 will tilt when lifted from the valve seat 20 because the center of gravity of the valve member is above the lifting surface 36. With the tilting of the valve member, the center 33 of the spherical seating radius moves away from the valve seat center line 21 as the valve member rotates about the radius center 39 of the valve stem lifting surface 36. This is shown diagrammatically in FIG. 2 by dot-dash line 24A representing the centerline of the valve member 24.

Figure 2:
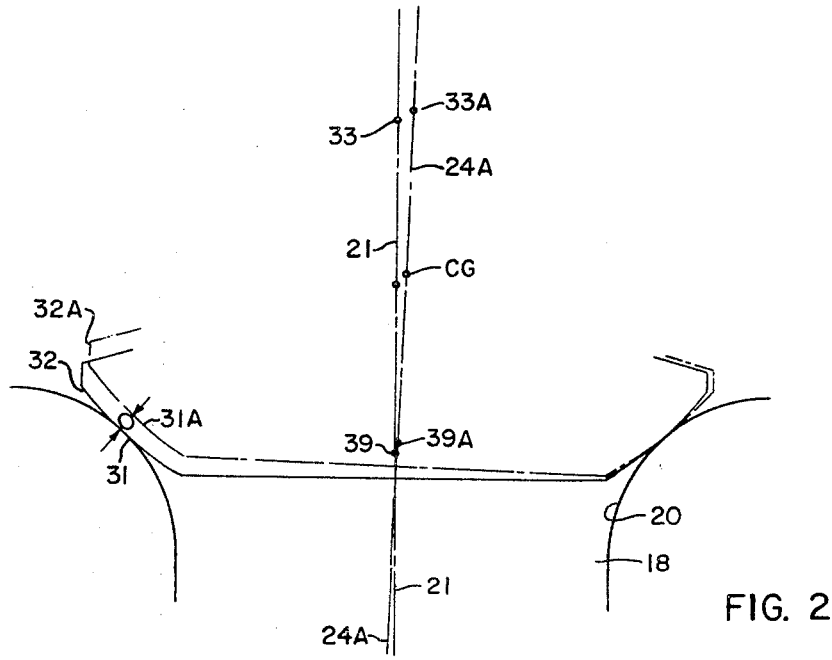
FIGS. 2 and 3 are diagrammatic presentations explaining some of the problems associated with the prior valve construction of FIG. 1.
Figure 3:
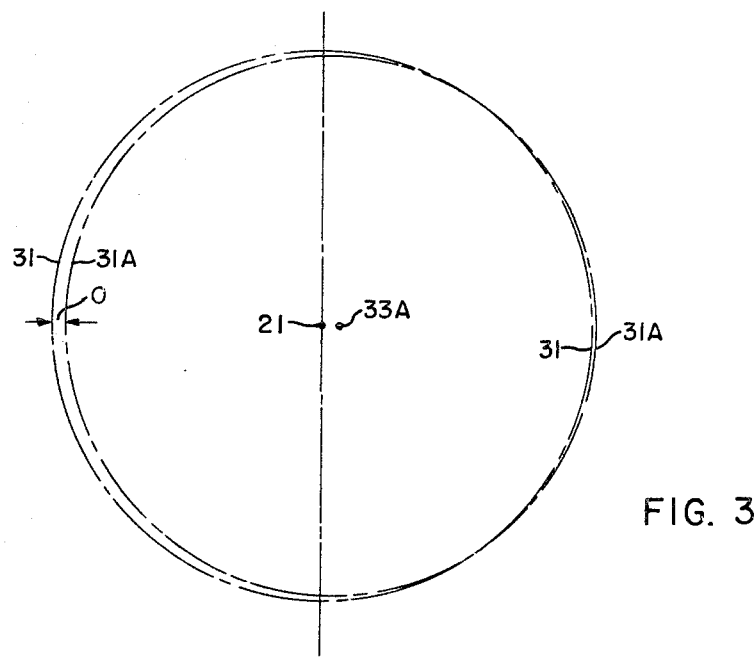

Thus, as shown in FIG. 2, the radius of the spherical seating surface 32 assumes a new center at 33A which is located on the centerline 24a and off the centerline 21. When this occurs, the seating surface shifts laterally and upwardly to a new location as indicated by the circular dot-dash out-line 32A, the right-hand portion resting on the valve seat 20 at a location 31A slightly above the original contacting location 31. This action lifts the opposed (left-hand) portion of the valve member seating surface away from the corresponding portion of the annular valve seat 20 to leave an unsymmetrical opening O of crescent shape in the valve as shown in FIG. 3.

With the crescent shape opening O, a high velocity vapor flow therethrough will tend to vibrate the valve stem 35, and the valve member 24 will tend to pean against the bore surface 25. Similarly the right-hand abutting portion of the valve end 30 will tend to pean against the corresponding portion of the annular valve seat 20. Since the center of gravity CG of the valve member is above the spherical lifting surface 36, the valve member has no restoring force with which to regain its aligned and equilibrium position. In fact, with the valve design of FIG. 1, the vibration tendencies are enhanced since the center of gravity endeavors to thrust further the center of the seating radius 39 in the direction of the off-center position as shown diagrammatically in FIGS. 2 and 3.

It will be further noted that the valve structure of FIG. 1 is partially closed at its valve seat end by the end portion 30 so that the volume of the balance chamber 28 is quite large, and the openings 29 in the end portion are located closely adjacent the path of fluid flow through the valve. For this reason, the openings are considerably restricted by a high velocity flow of fluid through the valve 10. The large volume of the balance chamber and the reduced effectiveness of the openings with high velocity fluid flow tend to increase the time of response of the chamber to changes in pressure downstream of the valve.

Figure 4:
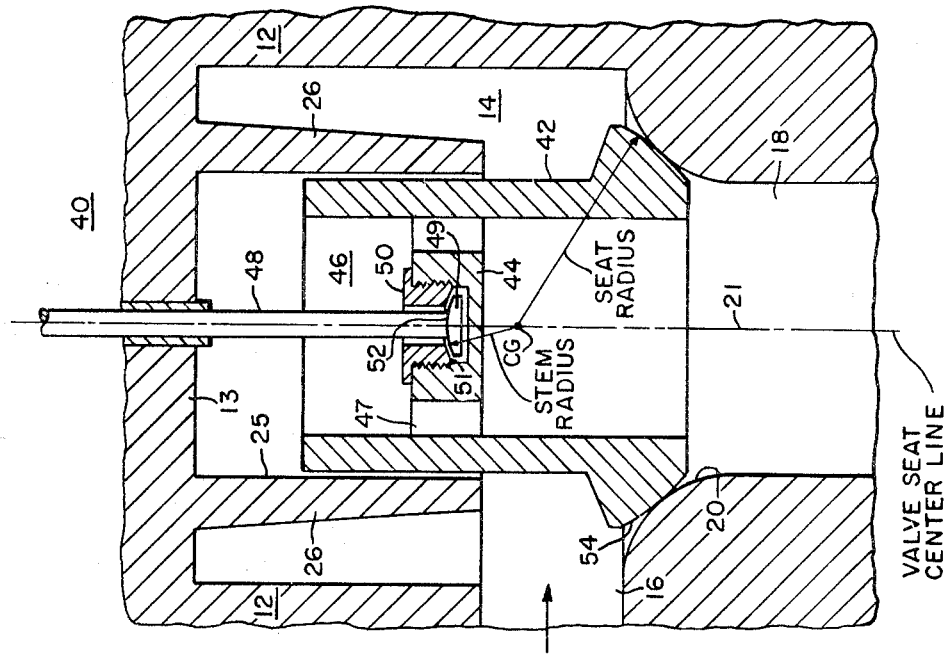
FIG. 4 is a sectional view of a valve structure constructed in accordance with the principles of the present invention.

In accordance with the invention, FIG. 4 shows a valve structure 40 which minimizes the above described and other disadvantages of the prior valve construction of FIG. 1. For simplicity of illustration, like numerals designate like parts in the structures of FIGS. 1 and 4.

The novel valve structure 40 includes a valve member 42 having a center partition 44 disposed above the center of gravity CG of the valve member and intermediate the ends of the valve member. The partition 44, with the depending valve guide structure 26 and the end wall 13, forms a balancing chamber 46 similar to the chamber 28 of FIG. 1. The chamber 46, however, is of considerably less length and has a considerably smaller volume than that of FIG. 1 by virtue of the intermediate location of the partition 44. The partition is provided with openings 47 for communicating the downstream pressure to the chamber 46 in a manner similar to that of FIG. 1.

The valve member 42 is connected to a lifting stem 48 having an enlarged end portion or flange 49 secured within the partition 44 by a member 50 threaded into the partition and having a concave surface 51. Like that of FIG. 1, the flange of the stem is provided with a convex spherical lifting surface 52 engaging the concave surface 51 of the member 50. Similarly, the lower portion of the valve member 42 is provided with a spherical seating surface 54 having a radius center coincident the center gravity CG. By virtue of the location of the partition 44, the center of the radius of the spherical lifting surface is now made coincident with the center of gravity CG and the center of the spherical seat radius of the valve member as shown.

As explained above, the balancing chamber 46 of the novel valve structure 40 is substantially smaller than that of prior construction as depicted in FIG. 1. For this reason, the valve structure of FIG. 4 responds faster to changes in the downstream pressure since said pressure changes are more quickly assimilated in the smaller volume of the chamber 46.

It will be further noted that the pressure communicating openings 47 of the novel valve member 42 are removed from the path of flow of any high velocity fluid past the valve seating surface 54. For this reason, the openings 47 are less subject to the restrictions caused by said flow therepast further insuring proper and rapid response of the balancing chamber 46 to changes in downstream pressure.

In the prior construction of FIG. 1, the valve seat 32 of the valve member 24 was given an energy absorbing flexible characteristic by virtue of the circumferential slot 34 in the enlarged end portion 30. This feature is expensive and thus adds to the cost of the valve.

With the valve structure 40 of the present invention this slot is not necessary in view of the lower center of radius of the valve seating surface 54. This lower center of radius provides a shorter radius and thus a smaller diameter seating surface 54 (for the same diameter valve seat 20) which, in turn, permits the valve member 42 to sit lower in the annular valve seat 20. The forces acting on the valve member with the rapid closing of the member against the annular valve seat are such that the impact energy is absorbed in the mass of metal forming the valve seat of the valve member 24 which deflects radially a controlled amount to reduce impact stresses. Thus, the novel valve structure of FIG. 4 provides an energy absorbing characteristic without the costly slot 34 of the prior construction.

It should now be apparent from the foregoing description that a new and useful valve structure 40 has been disclosed, said structure providing a simple yet a highly stable valve formed in an economical manner without the tilting and other problems of prior art structures. This is accomplished by attaching the valve member 42 to the actuating stem 48 at a location above the center of gravity of the valve member, and having the radii of the spherical lifting and seating surfaces 52 and 54, respectively, coincident with the center of gravity.

Although only one embodiment of the invention is shown it will be obvious to those skilled in the art that the invention is not so limited, but is susceptible to various changes without departing from the spirit thereof. For example, in the figures, only one valve member per valve chamber is shown. The invention may, however, be used with a steam chest (containing a plurality of valve members), for example, of the type shown and described in U.S. Pat. 3,073,563 issued Jan. 15, 1963 to C. R. Meyer et al. and assigned to present assignee.

What is claimed is:
1. A valve structure for controlling the flow of pressurized fluid, the structure comprising
   a housing forming a main valve chamber having an inlet and an outlet port communicating with said chamber,
   a stationary, annular valve seat associated with at least one of said ports and having a centerline extending through said valve chamber,
   a tubular shaped valve member slidably disposed within said chamber and having a center of gravity located on the valve seat centerline,
   a valve stem attached to said valve member and having a convex, spherical lifting surface located above the center of gravity of said valve member,
   said valve member having a convex spherical seating surface effective to engage said annular valve seat in a sealing manner,
   said spherical seating and lifting surfaces having radii, the centers of which are coincident with said center of gravity.
2. The structure described in claim 1 including
   a partition located within the tubular shaped valve member and at a position intermediate the ends thereof,
   said partition forming a pressure balancing chamber with a portion of the valve member and a portion of the valve housing, and
   openings extending through said partition for communicating the pressure downstream of the valve member to said balancing chamber.
3. The structure described in claim 1 including a partition located within the valve member at a position intermediate the ends thereof, and
   the spherical lifting surface being disposed and secured within said partition.
4. A valve structure for controlling the flow of pressurized fluid, the structure comprising
   a housing forming a main valve chamber having an inlet and an outlet port communicating with said chamber,
   a stationary annular valve seat associated with at least one of said ports,
   a valve member slidably disposed within said housing and in alignment with said valve seat for controlling the flow of fluid through said valve structure,
   said valve member having a center of gravity, and
   a valve stem having an end portion attached to said valve member at a location above the center of gravity thereof for lifting said valve member,
   said valve member having a convex spherical seating surface effective to engage said annular valve seat in a sealing manner,
   said spherical seating surface having a center of radius coincident with said center of gravity,
   said valve member being provided with a partition disposed intermediate the ends thereof and above the center of gravity thereof, and
   the valve stem end portion for lifting the valve member being secured within said partition.
5. The structure described in claim 4, in which
   the partition forms a pressure balancing chamber with a portion of the valve member and a portion of the valve housing, and
   at least one opening extending through said partition for communicating the pressure downstream of the valve member to said balancing chamber.

References Cited

UNITED STATES PATENTS

| 1,939,128 | 12/1933 | Meyer | 251—86 XR |
| 2,630,292 | 3/1953 | Skweir | 251—282 |
| 2,899,168 | 8/1959 | Kleczek | 251—282 XR |

FOREIGN PATENTS

| 278,080 | 9/1927 | Great Britain. |

HENRY T. KLINKSIEK, Primary Examiner